Dec. 8, 1953  D. SAMIRAN  2,661,761
MULTIPLE FUEL TANK SERVICING SYSTEM FOR AIRCRAFT
Original Filed July 26, 1944  5 Sheets-Sheet 3

INVENTOR.
DAVID SAMIRAN
BY
ATTORNEYS

Dec. 8, 1953 D. SAMIRAN 2,661,761
MULTIPLE FUEL TANK SERVICING SYSTEM FOR AIRCRAFT
Original Filed July 26, 1944 5 Sheets-Sheet 5

INVENTOR.
DAVID SAMIRAN
BY
ATTORNEYS

Patented Dec. 8, 1953

2,661,761

UNITED STATES PATENT OFFICE 2,661,761

MULTIPLE FUEL TANK SERVICING SYSTEM FOR AIRCRAFT

David Samiran, Dayton, Ohio

Continuation of application Serial No. 546,728, July 26, 1944. This application January 31, 1950, Serial No. 141,567

10 Claims. (Cl. 137—235)

(Granted under Title 35, U. S. Code (1952), sec. 266)

The invention described herein may be manufactured and used by or for the Government for governmental purposes, without the payment to me of any royalty thereon.

This application is a continuation of my application Serial No. 546,728, filed July 26, 1944, and now abandoned.

This invention relates to a system for refueling an entire group of fuel tanks of an aircraft simultaneously.

Fuel servicing systems now commercially available are equipped with pumps having a delivery rate of several hundred gallons per minute, and it is one of the objects of this invention to take advantage of this high delivery rate by dividing the flow from a pump of this kind among a number of tanks, as for instance among all of the tanks of one wing of a large multimotored airplane.

Since it would not greatly facilitate the servicing of a series of fuel tanks simultaneously if a separate connection were required to be made and unmade to each of the several tanks, it is another object of the invention to permanently connect the filler openings of the several tanks by means of a manifold having a branch extending to each tank and a single connection on the manifold to which the main supply hose may be attached.

In aircraft which employ a plurality of fuel tanks, it is not unusual that one tank may have greater volumetric capacity than the next, whereby, in pumping into a number of tanks simultaneously, the several tanks will become filled with fuel, one after the other, in the order of their capacity, which requires that fuel must be shut off from successive tanks as they get full. However, it may also happen that several tanks will reach the completely filled state at the same instant, in which case it may be difficult for the attendant to shut off several tanks at one and the same time if it is required to be done manually.

It is, therefore, another object of the invention to provide, in a multiple servicing system of this character, valve means on each tank, responsive to a predetermined fuel level condition, for automatically closing each tank against further fuel entry when it becomes filled to the predetermined level, and since such valve means will each respond separately to the fuel level in the particular tank to which they are attached, the several tanks may be placed at different levels or they may be located one above the other. Moreover, the shut-off valves may be permanently connected in the upper surfaces of the several tanks, thereby to avoid the necessity of removing and replacing a plurality of the conventional filler caps when the tanks are refueled.

Where a group of fuel tanks are thus arranged for simultaneous filling, it may become desirable to fill one or more only of the group without filling the entire group, or it may become desirable to shut off one or more of the tanks when they are partly but not completely filled.

It is therefore another object of the invention to provide manually operable means for each shut-off valve whereby it may be closed, against the fuel flowing through it to the tank, before, or at any stage of, the servicing operation.

In a multiple fuel system of the character herein disclosed, wherein the fuel being pumped must be conveyed through a main supply hose and nozzle valve, then through branch pipes and shut-off valves to the several tanks, it necessarily follows that a considerable volume of fuel amounting to at least several gallons, will be left in the conveying piping when all of the shut-off valves automatically close against further fuel inflow. If the servicing hose is now disconnected without consideration being given to this condition, the several gallons in the piping may be spilled, which is not only wasteful of fuel but constitutes a considerable fire hazard.

It is therefore another object of this invention to provide automatic means whereby the main servicing valve may not be shut off for disconnecting the servicing hose until the pump has been reversed and the conveying hose and piping pumped clean of fuel and vapor.

I attain the foregoing objects and advantages in the apparatus hereinafter more fully described, reference being had to the drawings, wherein:

Fig. 3 is an axial section through a shut-off valve, one of which is permanently secured in an opening of each tank of the series shown in Fig.

1, the valve in this view being shown in the normal or closed position.

Fig. 8 is another end view of the shut-off valve latching mechanism as it appears when tripped manually to close the valve without waiting for automatic closing to be effectuated.

Like reference characters refer to like parts throughout the several views.

Figure 1:
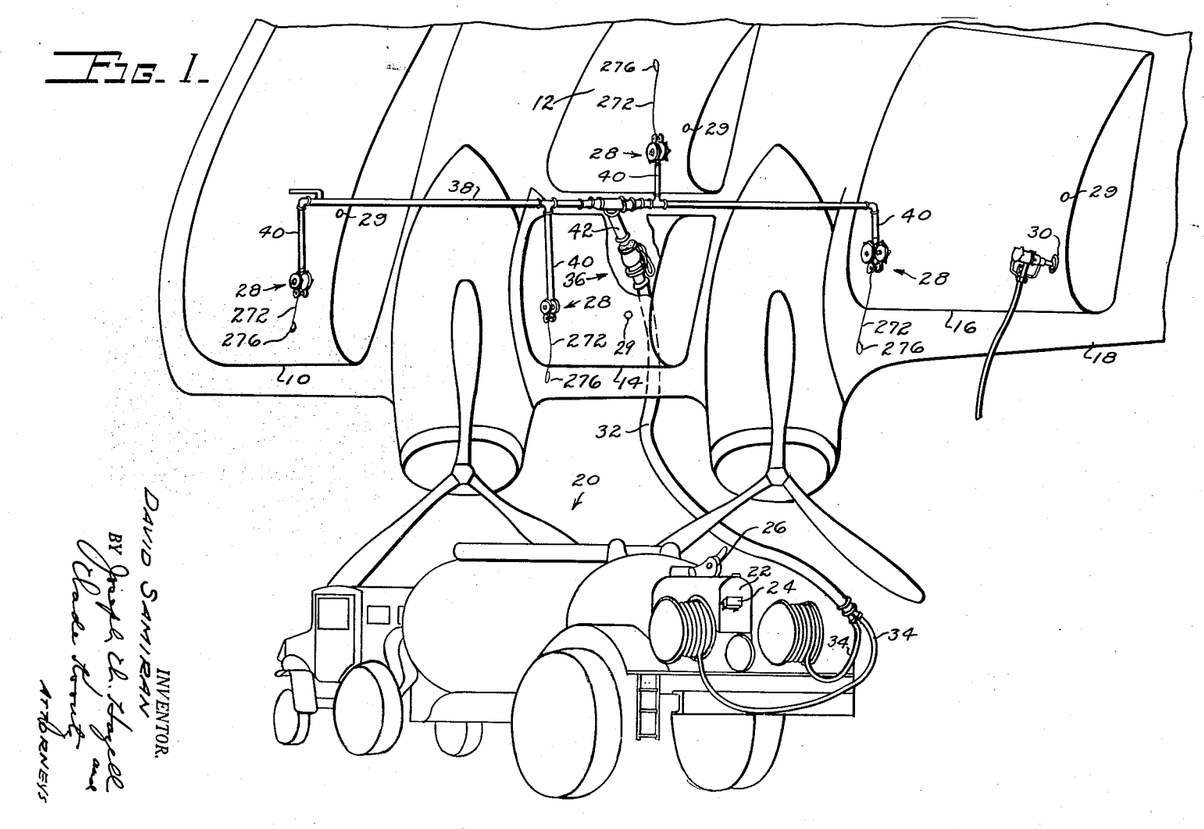
Fig. 1 is a schematic view of my improved fuel servicing system, showing one wing of an airplane, several fuel tanks of varying capacity which are carried in the wing, the necessary piping and hose connections, and a servicing tank truck equipped with a high delivery capacity pump.

Fig. 1 is a schematic view of my improved refueling system, arranged for application to four fuel tanks 10, 12, 14, and 16 which are contained in one wing 18 of a four motored airplane. A conventional refueling tank-truck 20 is provided with a high delivery rate fuel pump 22 having the usual pressure relief valve 24 which returns fuel from the discharge side of the pump back to the suction side when the pump discharge line is restricted to less than the full delivery capacity of the pump. A reversing valve mechanism 26 is also provided for changing the pump valving whereby the direction of fluid flow through the pump is reversed, the pump taking in fuel from what is normally the discharge pipe, and discharging it through what is normally the suction pipe back into the truck tank. As an alternative to reversing the pump connection, the direction of rotation of the pump itself may be reversed.

In my improved system, the several tanks are each provided, on the upper surface, with permanently affixed automatic shut-off valves 28. Valves 28 are normally closed tight, a valve being manually latched in an open position only when the tank to which it is attached is to be refuelled and it closes automatically only when the fuel in the tank has reached the desired "filled" level. Means are hereinafter described whereby these valves may be closed manually at any time. Access doors (not shown) may be contained in the wings, upper surface through which the automatic shut-off valves may be repaired or replaced. The conventional vents 29 are provided in the tanks. The conventional capped filler necks 30 are also retained in case it becomes desirable to fill a tank in the customary manner.

On the end of the main supply hose 32, which receives the discharged fuel from the pump 22 through two branches 34, is a main fuel supply nozzle 36 which is internally equipped with a valve mechanism which may be opened manually but may thereafter be closed only after a negative pressure has existed within the nozzle. The reason for providing this feature will hereinafter be more fully disclosed.

A manifold pipe 38 has a plurality of branches 40 which are permanently connected to the several shut-off valves 28, and a single branch 42 extending to the main fuel supply nozzle 36, the nozzle and its branch 42 being connectible by a quick attachable slip joint hereinafter to be described. Manifold pipe 38 may be rigid, but branches 40 and 42 had preferably be made of lengths of flexible hose. The three branches 40 taken together may preferably have a flow capacity equal to the main hose 32, 42. Likewise the flow capacity of both small hose 34 should preferably equal that of the main hose 32. The entire manifold, including the main branch 42 had preferably be contained within the wing structure and form a permanent part of the installation, the wing being provided, preferably in its underside, with an access door (not shown) through which the main nozzle 36 may be attached to the manifold when a refuelling operation is to be effected.

While the schematic view Fig. 1 shows only four separate fuel tanks connected by a single manifold, it will be obvious that the manifold may conveniently be extended to include fuselage tanks, or it may be extended to embrace the several tanks in the other wing of the airplane.

Figure 2:
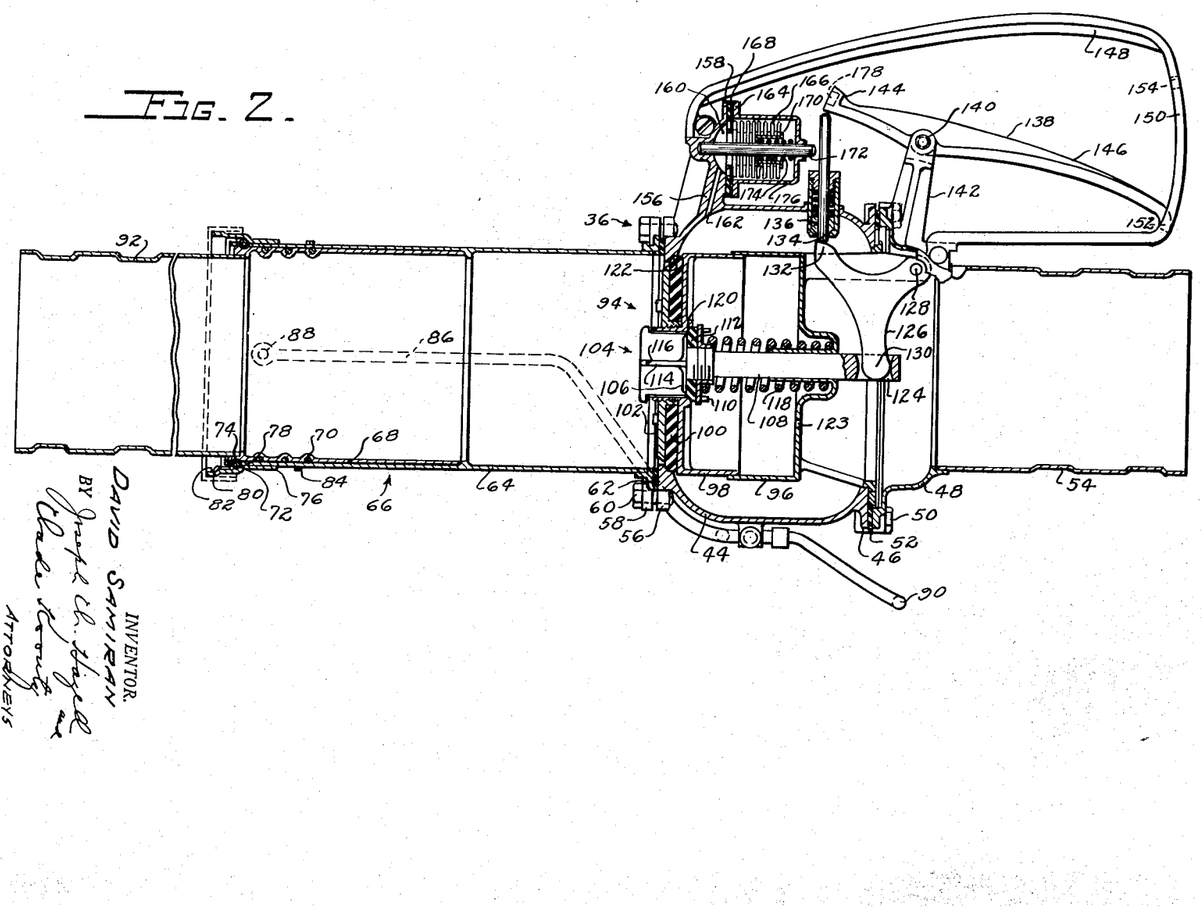
Fig. 2 is a view, principally in axial section, of the main servicing nozzle with its manually operable valve and its pressure responsive lock which prevents manual closing of the nozzle valve until the pump has been reversed and the piping evacuated.

The main fuel supply nozzle 36, Fig. 1, is shown in detail in Fig. 2, and comprises a body 44 having a flange 46 to which a flanged inlet hose fitting 48 is fastened by screws 50, a gasket 52 being interposed between the flanges to insure a pressure tight joint. A hose fitting sleeve 54 is permanently fastened to the fitting 48 by welding or similar means and is inserted in the main supply hose 32 (see Fig. 1) and securely fastened therein with hose clamps or equivalent means.

Body 44 also has a flange 56 to which a flanged outlet hose fitting 58 is fastened by screws 60, a gasket 62 being interposed between the flanges. One member 64 of a quick operating slip joint 66 is secured to the flange 58 by welding or equivalent means.

The mating member 68 of the slip joint 66 is provided with a series of external annular grooves in which yieldable seal rings 70 are carried. A plurality of circumferentially spaced detent balls 72 lie in openings which extend through the wall of the member 64 and into a shallow annular groove 74 in the periphery of the removable member 68.

A slip ring 76 has an internal diameter which at 78 is slidable over the member 64, at 80 is closely fitted around the circular row of balls 72 and at 82 is large enough to allow the balls 72 to move radially outward and out of the shallow groove 74 when the slip ring is moved axially to the right. A stop ring 84 limits axial movement of the slip ring. An operating rod 86 has one end connected to the slip ring as at 88, the other end 90 being brought to a position conveniently within the attendant's reach. A hose fitting sleeve 92 is welded or similarly secured permanently in the outer end of the member 68, the sleeve 92 being slipped into the branch 42, Fig. 1, and securely fastened therein by hose clamps or equivalent means. The branch 42, sleeve 92 and member 68 thus become a part of the permanent installation which remains with the airplane, while the member 64 remains attached to the nozzle 36 and thus remains a part of the permanent installation on the tank truck.

A main nozzle valve 94 is centrally disposed in the nozzle body 44 and comprises a cup-shaped valve guide 96 centrally supported in the body with a cup-shaped valve head 98 axially slidable therein, a renewable valve disc 100 being held on the head 98 with the nut 102.

An auxiliary valve 104 has a head 106 and a stem 108 integral. A nut 110, threaded on the stem, holds a renewable disc 112 secured on the head. Ribs 114 on the auxiliary head 106 are axially slidable in the central opening of the main head 98, the ribs having shoulders 116 so positioned that when the auxiliary valve head is raised a short distance by the stem 108, the shoulders 116 will contact the main valve head and the main valve will be opened by the same stem and with the same movement as opens the auxiliary valve. Thus the auxiliary valve will always open slightly ahead of the main valve. The reason for this construction will become obvious as the description proceeds.

A relatively strong spring 118 urges the auxiliary valve 104 to close against the seat 120 in the main valve head 98 which in turn urges the main valve to close against the seat 122 in the valve body 44. A small hole 123 through the wall of the cup-shaped valve guide 96 makes a dash pot of the telescoping parts 96 and 98 so that the valve 94 may not close too rapidly.

The valve stem 108 extends through and is slidable in the hub of the valve guide 96, the upper end of the stem being slotted through at 124 to receive the lever 126 by which the valves are opened.

Lever 126 is fulcrumed at 128, the work arm 130 of the lever extending into the slot 124, the power arm 132 being interposed in the path of the operating stem 134. The operating stem 134 emerges from the valve body 44 through a spring pressed packing 136.

A manually operable lever 138 is pivotally supported at 140 on an arm 142 which extends upward from the body 144. The work end 144 of the lever is adjacent the outer end of the operating stem 134, whereby pulling the power end 146 of the manual lever 138 upward pushes the operating stem 134 downward to open the valve. A handle grip 148 is slotted at 150 for the end 152 of the manual lever, and a notch 154 is offset at the upper end of the slot 150 so that the end 152 of the lever may rest on the notch to hold the valve open.

Extending upward from the body 44 is a bracket 156 which carries a flange 158 at its upper end. Flange 158 is chambered out at 160 and a small passageway 162 connects the chamber to the inside of the valve body 44. A flanged housing 164 is attached pressure tight to the flange 158. A bellows 166 within the housing 164 has one end attached to a disc 168 which has a large central opening, whereby the interior of the bellows is connected to the chamber 160 and through the passageway 162 to the interior of the valve body 44.

The free end of the bellows 166 is closed by a hub 170 to which a locking pin 172 is secured by soldering or similar means. A light spring 174 holds the pin in the position shown when atmospheric pressure obtains within the bellows. The outside of the bellows is connected to atmosphere by means of a small opening 176. A pocket 178 in the work end 144 of the manual lever 138 becomes aligned with the locking pin 172 whenever the end 152 of the manual lever is rested on the notch 154, and if at that time there is positive pressure within the valve body 44, the locking pin will be seated in the pocket 178, and thereafter the manual lever may not be released and returned to the closed valve position until a sufficient negative pressure obtains within the valve body 44 to withdraw the locking pin 172 from the pocket 178.

The main fuel supply nozzle 36 above described is thought to be new apart from the rest of the system, the novelty being in providing a valve of this type with a manual valve opening mechanism, which, when once operated to open a valve, cannot be operated to close it until negative pressure has been introduced into the valve interior.

Figure 3:
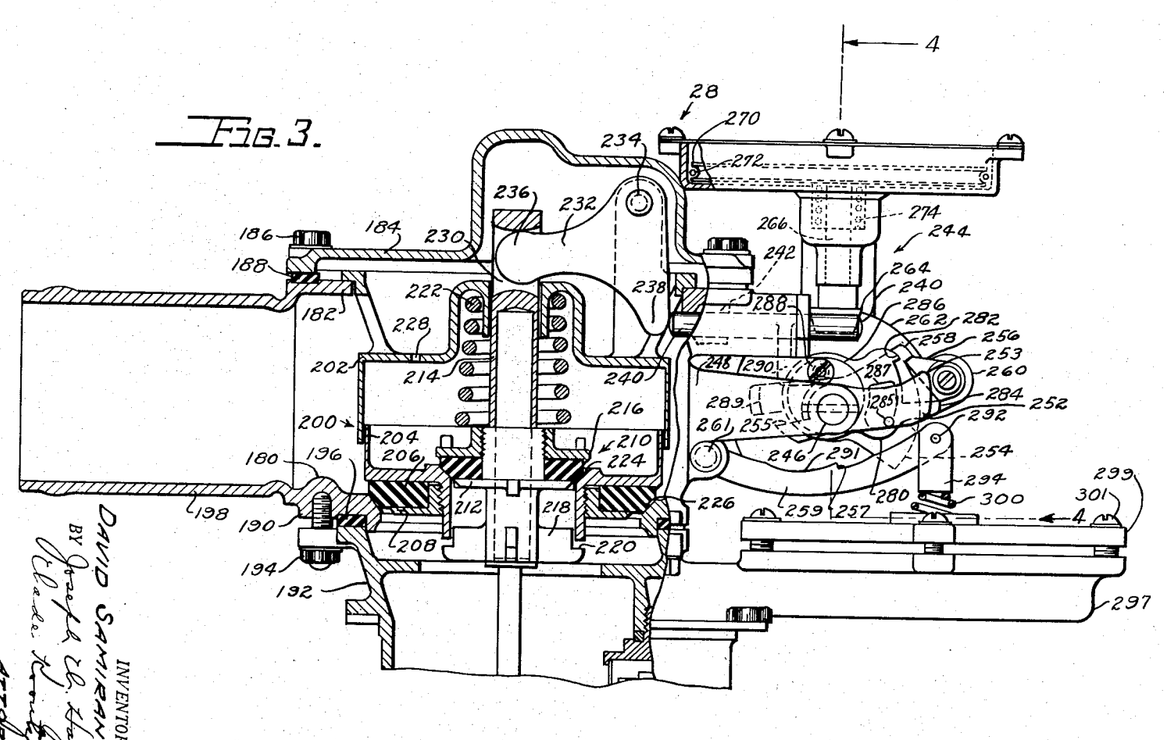

Referring now more particularly to Fig. 3 which shows the automatic shut-off valve 28 in vertical axial section and with the valve in the normal or closed position, a valve body 180 has an upper flange 182 to which a cover 184 is fastened by screws 186, a gasket 188 being interposed between the cover and flange. Valve body 180 also has a lower flange 190 to which a discharge spout 192 is secured by screws 194, a gasket 196 being inserted between the spout and flange. A sleeve 198, integral with the body 180 fits into a length of hose 40, Fig. 1, and is secured thereto by suitable hose clamps.

A large shut-off valve 200 is centrally located in the body 180. A cup-shaped valve guide 202 is centrally supported in the body with a cup-shaped valve head 204 vertically slidable therein. A renewable valve disc 206 is held on the head 204 by means of a nut 208.

An auxiliary valve 210 has a head 212 and a stem 214 integral. A nut 216, threaded on the stem, holds the renewable disc 206 secured on the head. Ribs 218 extend radially from the hub of the auxiliary head 212, their outer ends being axially slidable in the central opening of the large head 204. Ribs 218 have shoulders 220 so positioned that when the auxiliary valve head is raised a limited distance by the stem 214, the shoulders 220 will contact the main valve head and the main valve head will be opened by the same stem and with the same movement as opened the auxiliary valve head. The auxiliary valve will therefore always open slightly ahead of the large valve.

A valve closing spring 222 yieldably holds the auxiliary valve head 212 against its seat 224 in the large valve head 204, which in turn holds the main valve against the seat 226 in the body 180. A vent 228 in the upper wall of the valve guide 202 makes a dash pot of the valve guide and the valve head, to prevent too rapid closing of the valves. The valve stem 214 extends through and is slidable in the hub of the valve guide 202. The upper end of the stem 214 is slotted through at 230 to receive the lever 232 by which the valves are opened.

Figure 7:
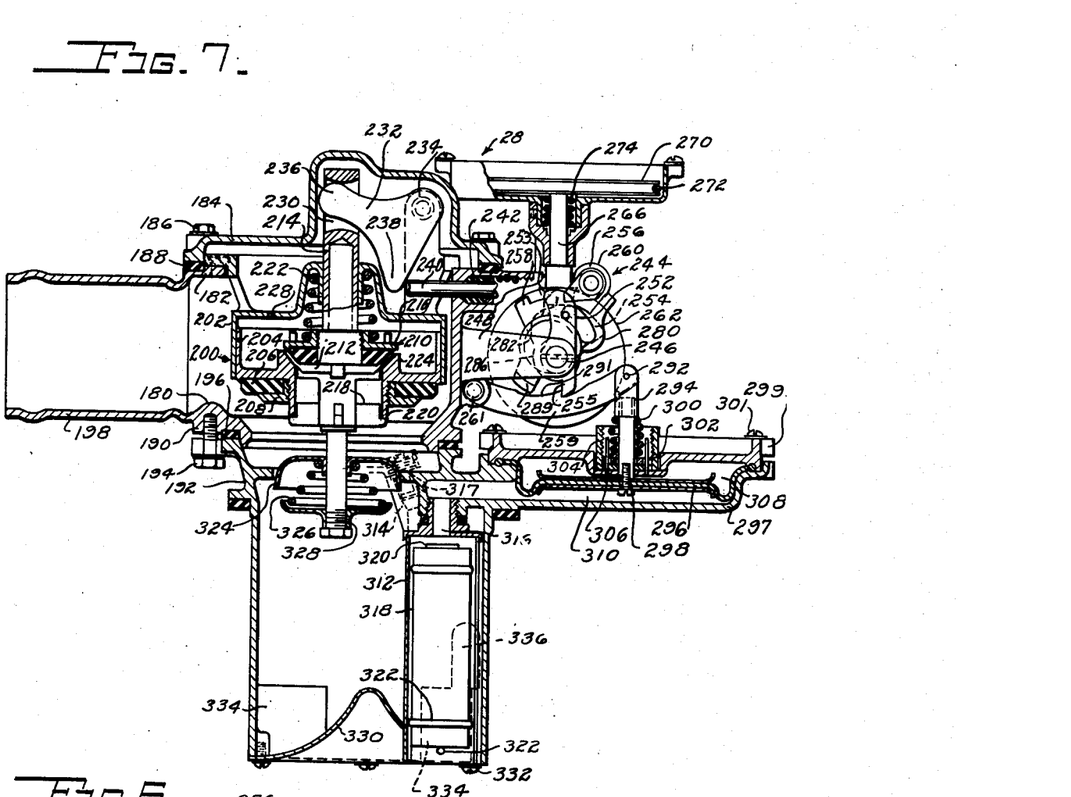
Fig. 7 is a view similar to Fig. 3, but with the valve in the open position.

Valve opening lever 232 is fulcrumed at 234, the work arm 236 of the lever extending into the slot 230, the power arm 238 being interposed in the path of the valve operating rod 240. The valve operating rod 240 emerges from the valve body 180 through a spring pressed packing 242. Inward movement of the valve operating rod 240 against the power arm 238 causes the work arm 236 to raise the valve stem 214, which opens the auxiliary valve 210 and equalizes the pressure above and below the large valve 200 so that the large valve may be raised more easily. When the shoulders 220 engage the bottom of the valve head 204, the auxiliary valve has reached the limit of its opening and thereafter any further upward movement of the stem 214 raises the large valve 200 off its seat until it is wide open as seen in Fig. 7.

Figure 4:
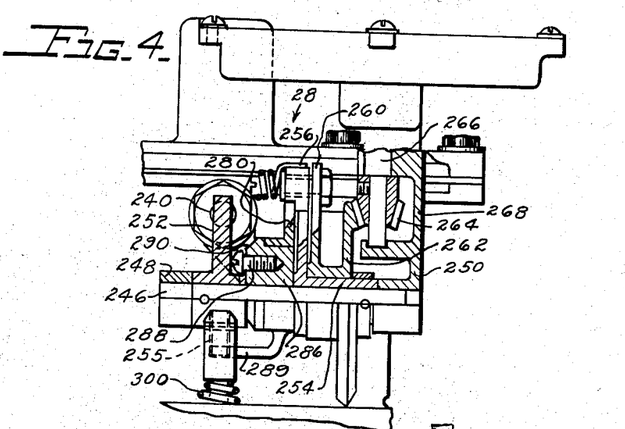
Fig. 4 is an axial section, taken on the line 4—4 of Fig. 3, through the shut-off valve latching mechanism, this mechanism being actuable manually to set the valve in the open position, actuable automatically by a full tank condition to close the valve, or actuable manually to close the valve when that is desired before automatic closing is effected.

The latch mechanism 244 provided for forcing the valve operating rod 240 inward to the open valve position, for latching it in that position, and for tripping it for return to the closed valve position will next be described.

A shaft 246 has bearing in brackets 248 and 250 extending from the valve body 180 said valve body thus forming a framework for said bearings. Rod operating lever 252 and shaft rocking lever 254 are both fast on the shaft 246 whereby forward movement (forward being anticlockwise in the drawing), imparted to the shaft by the shaft rocking lever 254 will impart forward movement to the rod operating lever 252, a boss 253 of which in turn pushes the valve operating rod 240 inward and the projection 255 of which engages the notch 257 of the latch 259 to hold the rod in the inward position. Latch 259 is hinged on the valve body 180 at 261.

A pawl 256 engages the lug 258 of the lever 254 for imparting forward movement thereto. Pawl 256 is carried on an arm 260 which extends integrally from the hub of a bevel gear 262, the bevel gear hub being freely rotatable on the hub of the lever 254.

A bevel pinion 264 is in mesh with the bevel gear 262. A shaft 266 to which the bevel pinion is secured has rotative bearing in a bracket 268 which extends upward from the bracket 250. A sheave 270 is fast on the upper end of the shaft 266. A short length of cable 272 has one end wound around the sheave in such direction that pulling on the cable moves the bevel gear and the pawl forward, i. e., anticlockwise in the drawing. A torsion spring 274 is provided for returning the sheave 270, gear 262, arm 260, and pawl 256 to the home position after it has moved the lever 252 far enough to have the projection 255 of the lever caught and held by the latch 259, whereby the rod 240 is latched in the open valve position. A hand grip 276 is provided for each cable (see Fig. 1). The part of the mechanism for releasing the latch 259 manually so as to allow the valve to close, will next be described.

Figures 5, 6:
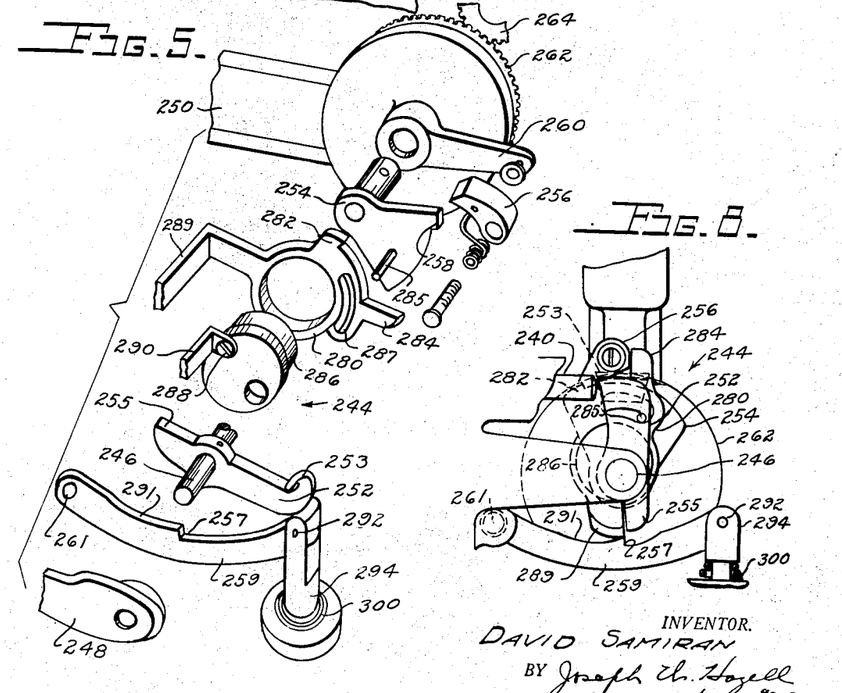
Fig. 5 is an exploded view of the shut-off valve latching mechanism of Fig. 4.
Fig. 6 is an end view of the shut-off valve latching mechanism shown in the process of setting the valve of Fig. 3 in the open position.
Figure 6:
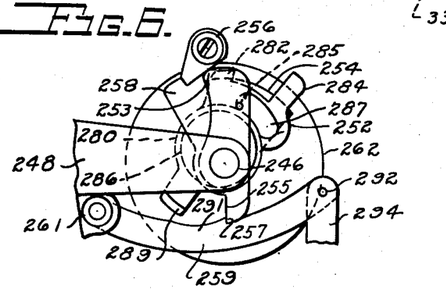

Between the rod operating lever 252 and the shaft rocking lever 254, is a latch release lever 280 having a lug 282 for the pawl 256 to engage and a stop limb 284 for arresting further backward rotation of the pawl when the home position is reached. It is noted that the pawl 256 is wide enough to operate both the shaft rocking lever 254 and the latch release lever 280. A pin 285 extends laterally from the shaft rocking lever 254 into a lost motion slot 287 in the latch release lever 280. A latch disengaging arm 289 extends laterally from the latch release lever 280 and is adapted, when the latch release lever is moved forward to its extreme position, to act on the cam surface 291 and trip the latch 259 which allows the valves to close. Latch release lever 280 rotates freely on an eccentric 286. Shaft 246 passes through the eccentric 286 rocking freely therein. The eccentric 286 is itself secured against rotation by means of a screw 288 which fastens the eccentric to a bracket 290 which extends laterally from the hub through which the valve operating rod 240 passes. The two operations, one for opening the valves and latching them in the open position and the other for tripping the latch manually for allowing the valve to close, are substantially as follows:

Starting with the valves closed and the latch mechanism 244 in the home or closed valve position as shown in Fig. 3, the attendant pulls the cable 272 to cause the pawl 256 to move forward and act against the lug 258 to turn the shaft rocking lever 254 and the rod operating lever 252 forward, whereby the lug 253 pushes the valve operating rod 240 all the way in, whereby the valves are open. This allows the latch 259 to catch and retain the projection 255, whereby the valves are latched in the open position.

By reference to Fig. 3, it will be seen that when the pawl acts against the lug 258 of the shaft rocking lever 254 it will pass right over the lug 282 of the latch release lever 280. This is because the lug 282 of the latch release lever 280 is now on the low part of the eccentric 286. However, by the time the pawl has passed over the lug 282, the pin 285, which in the home position Fig. 3 is in the rearward end of the slot 287, will be in the forward end of the slot 287, and thereafter further advance of the shaft rocking lever 254 by the pawl 256 will turn the latch release lever 280 so that the lug 282 will now be on the high part of the eccentric 286 as seen in Fig. 6. In this position the notch 257 of the latch 259 catches and holds the projection 255 of the rod operating lever 252, whereby the valves are latched open.

When the attendant now releases the cable 272, the pawl moves backward and clicks over the lug 282 of the latch release lever 280 and returns to the position shown in Fig. 7 where the pawl has dropped in back of the lug 282 of the latch release lever 280.

If it is now desired to close the valves manually, the cable is again pulled, but this time movement of the pawl 256 turns the lug 282 of the latch release lever 280 to a position alongside the lug 258 of the shaft rocking lever 254 (see Fig. 8) which coincidentally causes the latch disengaging arm 289 of the latch release lever 280 to act on the cam surface 291 of the latch 259 which trips the latch and allows the valves to close. The mechanism for tripping the latch automatically in response to a full tank condition will now be described.

The outer or free end of the latch 259 is hinged at 292 to a bifurcated upper end of a stud 294, the lower end of the stud being fastened to a diaphragm 296 by means of a screw 298. The outer edge of the diaphragm 296 is held between a lateral extension 297 of the fuel outlet spout 192 and a diaphragm cover 299, the cover being secured to the extension by screws 301. A spring 300 urges the stud 294 upward. Spring 300 rests on an externally threaded disc 302 which is fitted into an internally threaded sleeve 304 which is freely rotatable in a depressed portion of the diaphragm cover 299, whereby rotation of the sleeve 304 adjusts the spring 300. Pins 306 fast in the cover 299 extend loosely through holes in the disc to prevent it rotating. Slight spaces around the pins 306 and stud 294 connect the space 308 above the diaphragm to the atmosphere. The space 310 below the diaphragm is adapted to be subjected to sub-atmospheric pressure as will hereinafter appear.

Eccentrically disposed within the fuel outlet spout 192 is a float casing 312, the upper end of which is in communication with the interior of the valve body 180 when the valve is open by way of the jet 314, and in communication with the space 310 below the diaphragm 296 by way of the passageway 316. A passageway 317 connects the jet 314 to the space 310, whereby downward movement of fuel through the jet creates a suction in the passageway 317. A float 318 is freely movable carrying a disc 320 which, upon upward movement of the float, covers and closes the passageway 316. A pin 322 limits downward movement of the float in the casing.

In order to insure that an adequate supply of fuel will pass through the jet 314, a baffle 324 in the form of an inverted bowl is lightly held over the outlet of the valve body by a spring 326, the valve spindle 214 being extended downwardly for carrying a support 328 for the lower end of the spring.

The bottom of the spout 192 is closed by a conical member 330 which is held on by screws 332. Lateral openings 334 on the side wall of the spout are provided for the discharge of fuel. Upward extensions 336 of the discharge openings 334 are brought up high enough to insure that, when the valve shuts off, the level of the fuel will not be above the upper edges of the extensions, for if it were above this line, then some of the fuel would necessarily have to be pumped out of the tank before the valves, piping, and nozzle could be evacuated by reverse pumping.

The automatic shut-off valve 28, above described, is not considered broadly new, a similar shut-off valve being shown and described in the copending application of Samiran and Fink, Serial No. 480,162, filed March 23, 1943, now Patent No. 2,420,341, granted May 13, 1947, the novelty in the shut-off valve 28 shown in the present application being in the manually operable latching mechanism whereby one pull on a cord latches the valve in the open position, and the next pull lets it return to the closed position.

The complete refueling system had preferably be operated substantially as follows:

Connection of the tanks 10, 12, 14, and 16 of the airplane, to the pump 22 of the tank truck 20, is made by telescoping the parts 64 and 68 of the slip joint 66 of the nozzle 36 and locking them together with the operating rod 86—90 and collar 76 as shown in Fig. 2.

The automatic shut-off valve 28 of each tank which is to be filled, should now be shifted to, and locked in, the open position. This is accomplished by pulling the cable 272 on each valve as far as it will go. The latch mechanism 244 will then be in the condition shown in Fig. 6 until the cable is released, whereupon it will take the position shown in Fig. 7.

The lever 138 of the nozzle 36 may now be drawn up, and the end 152 caught in the notch 154, whereupon the nozzle valves 94 and 104 will be open. The tank pump 22 is then started, and, when the pressure rises, the locking pin 172 will be seated in the pocket 178 to prevent manual closing of the nozzle for the time being.

As pumping proceeds, it may become desirable to stop pumping into one or another of the tanks before it is full. If such a condition occurs, the cable 272 of that particular tank may be pulled, whereupon the latch release lever 280 of the particular shut-off valve will operate the latch disengaging arm 289 and trip the latch 259, whereby the tank in question is shut off against further fuel inflow. The latch mechanism 244 will then appear as in Fig. 3.

Any tank which has not been shut off manually as above described before it becomes filled, will do so automatically as soon as it is filled. For example, as fuel flows into the tank, part of it flows through the jet 314, which creates a suction by way of the passageway 317 in the space 310 under the diaphragm 296. But as long as the passageway 316 is open, the suction in the space 310 will be insufficient to pull the diaphragm down. However, when the fuel rises in the tank high enough to lift the float 318 so that the disc 320 closes the passageway 316, the suction in the space 310 will at once become great enough to trip the latch 259 and allow the valves to close, whereupon the latch mechanism will again appear as in Fig. 3.

When refueling of the tanks has been completed as above described, and the shut-off valves are all closed, the relief valve 24 of the tank truck pump 22 will momentarily pass the entire capacity of the pump from the discharge side back to the suction side. When the attendant finds that all of the shut-off valves are closed, he reverses the suction and discharge connections on the pump by means of the valve lever 26, whereby the pump evacuates whatever fuel remains in the hose, nozzle, piping, and shut-off valves and returns it to the truck tank 20.

After the liquid fuel has all been evacuated from the system, operation of the pump 22 may be continued until the fuel vapor has likewise been drawn from the system, air being drawn in through the vents 28 and extension 336 up through the valves 200—210 which, although resiliently held in the closed position, will nevertheless pass fuel or vapor in the reverse direction. It is noted, however, that in pumping backwardly through the spring closed check valves 200 of the shut-off valves, a considerable vacuum will be created within the nozzle and other conduits. When the system has been thus evacuated to the point where the negative pressure in the nozzle 36 withdraws the locking pin 172 from the pocket 178, the end 152 of the lever 138 may be released from the notch 154 to allow the nozzle valve to close and the handle 90 operated to unlock the slip joint 66 and thereby disconnect the nozzle 36 from the branch 42, whereupon the refuelling operation will be completed.

While in the foregoing procedure in the operation of the system, the shut-off valves and the nozzle valves were latched open prior to the starting of the fuel pump 22, it is noted that the pump may be started first and the valves opened thereafter, inasmuch as the shut-off valve arrangement and the nozzle valve arrangement each comprises a large and a small valve with mechanism for raising the small valve ahead of the large one, whereby only a fraction of the force is required to open the large valve against the pressure being created by the pump for the reason that the pressure is somewhat equalized above and below the large valve by the fuel flowing through the small valve.

Furthermore, while in the operation of the system above described, the nozzle is manually latched in the open position by placing the end 152 of the lever in the notch 154, and is unlatched manually after the locking pin 172 has been automatically released by the negative pressure of evacuation, the notch 154 may be omitted if the pump is started before the nozzle is opened, for then the locking pin 172 will snap into the pocket 178 when the end 146 of the lever 138 is raised to the up position and will remain there until it is automatically released by the negative pressure of evacuation.

Having described my improved refuelling system, I claim:

1. For controlling an axially movable rod which is spring biased to an unoperated position; a manually operable latching device which comprises a shaft, bearings for said shaft, a framework for supporting said bearings, a shaft rocking lever and a rod operating lever spaced apart on and secured to said shaft, a collar between said levers fixed against rotation on said framework eccentric to said shaft, an operating rod release lever rockable on said eccentric collar, a pawl arm adjacent the shaft rocking lever rockable on said shaft, a pawl on said arm wide enough to engage the shaft rocking lever and the operating rod release lever, a lug for said pawl to engage on the shaft rocking lever, a second lug for said pawl to engage on the operating rod release lever, positioned thereon so that, when the operating rod release lever is at the starting position, said second lug will be opposite a low side of the eccentric collar, whereby said pawl will pass over the top of said second lug and engage the first said lug, and when said operating rod release lever has rocked halfway of its movement, said second lug will be opposite a higher side of the eccentric collar, whereby the pawl may engage said second lug, a rod operating boss and a latch engaging projection on the rod operating lever, a pawl stop limb and a latch disengaging arm on the operating rod release lever, a lost motion connection between the shaft rocking lever and said operating rod release lever whereby rocking said shaft rocking lever through the first half of its movement does not move the operating rod release lever, but rocking said shaft rocking lever through the second half of its movement rocks the operating rod release lever through the first half of its movement, whereby one actuation of the pawl arm moves said operating rod to the operated position and latches it in that position, and the next actuation of the pawl arm releases said latch and allows said rod operating lever to return to its unoperated position.

2. For controlling an axially movable rod which is spring biased to an unoperated position, a latching device which comprises a rockable shaft, a shaft rocking lever and a rod operating lever on and secured to said shaft, a collar eccentrically positioned on said shaft but fixed against rotation, a rod release lever rockable on said eccentric collar, a pawl arm rockable on said shaft, a pawl on said arm for engaging the ends of both the shaft rocking lever and the rod release lever so positioned that when the free end of the shaft rocking lever is at the starting position, the free end of the rod release lever will be opposite the low side of the eccentric collar whereby said pawl will pass over the end of said rod release lever and engage the end of the shaft rocking lever only, and when said shaft rocking lever has rocked half way of its movement, said rod release lever will be opposite a higher side of the eccentric collar, whereby said pawl may engage said rod release lever, a rod operating boss and a latch engaging projection on the rod operating lever, a pawl stop limb and a latch disengaging arm on the rod release lever, a lost motion connection between the shaft rocking lever and said rod release lever whereby rocking said shaft rocking lever through the first half of its movement does not move the rod release lever but rocking said shaft rocking lever through the second half of this movement rocks the rod release lever through the first half of its movement, whereby one actuation of the pawl arm moves said rod to the operated position and latches it in that position and the next actuation of the pawl arm releases said latch and allows said rod operating lever to return to its unoperated position.

3. In combination, a fluid conduit, pumping means on one end of said conduit for selectively creating suction or pressure in said conduit, a nozzle comprising a hollow body having an inlet and an outlet, said inlet being connected to the other end of said conduit, a check valve at said outlet biased to prevent flow of fluid from said outlet, a resilient means for holding said check valve closed, a manual means for overriding said resilient means and moving said valve to open position, a manually releasable catch for momentarily holding said manual overriding means in the valve open position, a latch engageable for locking said manual overriding means in the valve open position, a pressure responsive means for operating said latch, a passageway located between said check valve and said conduit connecting the hollow of said valve body to said pressure responsive means, said pressure responsive means being thereby made operative by fluid under pressure in said conduit to engage said latch with said manual overriding means to thereby hold said manual overriding means in valve open position and operative by fluid under suction in said conduit to release said latch from said manual overriding means, thereby to allow said manual overriding means to be returned by said resilient means to the valve closed position, whereby, whenever said valve is in the open position and fluid under pressure is introduced into said valve body between said check valve and said conduit, said valve is locked open and may not thereafter be closed manually unless fluid under suction is first introduced into said valve body between said check valve and said conduit.

4. In combination, a fluid conduit, means on one end of said conduit for selectively providing suction or pressure in said conduit, a nozzle comprising a hollow body having an inlet and an outlet, said inlet being connected to the other end of said conduit, a valve at said outlet closable to prevent flow of fluid from said outlet, a resilient means for holding said valve closed, a manual means for overriding said resilient means and moving said valve to open position, a latch for locking said manual overriding means in the valve open position, a pressure responsive means for operating said latch, a passageway upstream of said check valve connecting the hollow of said valve body to said pressure responsive means, said pressure responsive means being thereby made operative by fluid under pressure in said conduit to engage said latch with said manual overriding means to thereby hold said manual overriding means in valve open position and operative by fluid under suction in said conduit to release said latch from said manual overriding means, thereby to allow said manual overriding means to be returned by said resilient means to the valve closed position, whereby, whenever said valve is in the open position and fluid under pressure is introduced into said conduit said valve is locked open and may not thereafter be closed manually until fluid under suction is introduced into said conduit.

5. Refuelling apparatus for an aircraft fuel system comprising a fuel supply, a group of vented fuel tanks to be filled, a valve for each tank, a manifold having a distributing branch extending to each valve and a receiving conduit extending to the fuel supply, a float actuated mechanism associated with each tank adapted to close said valves at a selected fuel level but arranged to allow backward flow through said vents, valves and branches when said float actuated mechanism has operated, and a reversible pump for pumping fuel in one direction through said valves into said tanks and in the other direction for pumping air through said vents, valves and manifold.

6. In a fuelling system, the combination of a series of fuel tanks each having an inflow opening and a vent, a manifold having a branch conduit extending to each inflow opening, a hose connection in said manifold having the inner end in flow communication with said manifold and the outer end formed to receive a servicing hose nozzle, a valve structure in each tank, flow connected to the outer ends of the branch conduits, adapted in the closed position to prevent fuel outflow through said branch conduits, float mechanism associated with each said valve structure adapted to close said valve at a predetermined fuel level and one-way valve means including in said valve structure adapted to permit flow backwardly through said vents, said branch conduits and said manifold through said hose connection.

7. In combination, a series of vented tanks, a manifold having a branch conduit extending to an inflow opening in each tank, a source of pressurized fuel, fluid conducting means having one end flow connected to said manifold and the other end flow connected to said source of pressurized fuel, valve mechanism comprising means closable to arrest flow through said fluid conducting means into said tanks but permit flow through said vents, valves, branch conduits and fluid conducting means in the reverse direction, and means to selectively change the pressure in said source from positive pressure to negative pressure.

8. Refuelling apparatus for an aircraft fuel servicing system comprising a fuel supply, a group of vented tanks to be filled from said supply, a shut-off valve for each tank, a manifold having a distributing branch extending to each valve and a receiving conduit extending to the fuel supply, a float operated mechanism associated with each tank adapted to close said valves against further fuel inflow at a selected fuel level, and means to cause positive pressure in said manifold to move fuel through the open valves into said tanks, and negative pressure in said manifold to draw excess fuel and/or vapor from said manifold backwardly through said valves and to draw air in through said vents.

9. Refuelling apparatus for an aircraft fuel servicing system which comprises a fuel supply, a group of vented fuel tanks to be filled from said supply, a shut-off valve for each tank, a manifold having a fuel inflow branch extending to each valve, and a receiving conduit extending to the fuel supply, a float operated mechanism associated with each tank adapted to close said valves against further fuel inflow at a predetermined fuel level below said fuel inflow opening, pressure means to force fuel through said fuel inflow branches into said tanks, and suction means to withdraw fuel vapor backwardly through said tank, valve, and manifold, and air into said tank through said vents and valves after said valves have closed, against further inflow.

10. Refuelling apparatus for an aircraft fuel servicing system which comprises a fuel supply, a group of vented fuel tanks to be filled from said supply, a shut-off valve for each tank, a manifold having a fuel inflow branch extending to each valve, a fuel supply nozzle, and a receiving conduit extending to said fuel supply nozzle, a float actuated mechanism associated with each tank, adapted to close said valves against further fuel inflow at a predetermined fuel level below said fuel inflow opening, manual means to latch said shutoff valves in the open position, manual means to latch said nozzle in the open position, pressure means to force fuel through said fuel inflow branches into said tanks, suction means to withdraw fuel vapor and air from said valve mechanism, said nozzle, and said manifold and air through said vents after said valves have closed against inflow, and nozzle unlatching means operable by said suction.

DAVID SAMIRAN.

References Cited in the file of this patent
UNITED STATES PATENTS

| Number | Name | Date |
|---|---|---|
| 334,268 | McKenzie | Jan. 12, 1886 |
| 1,580,493 | Johnson | Apr. 13, 1926 |
| 1,736,933 | Morgan | Nov. 26, 1929 |
| 1,746,814 | Benedict et al. | Feb. 11, 1930 |
| 1,865,886 | Clingingsmith | July 5, 1932 |
| 2,160,741 | Jensen et al. | May 30, 1939 |
| 2,362,559 | Jauch | Nov. 11, 1944 |
| 2,509,978 | Ksieski | May 30, 1950 |